Figure 1:
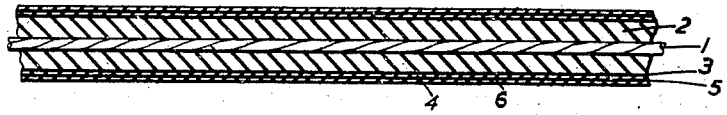

June 3, 1947. H. E. KRETSCHMER 2,421,625
MANUFACTURE OF VULCANISED RUBBER ARTICLES
Filed Feb. 11, 1944

Inventor
Herbert Emanuel Kretschmer
By
Attorney

Patented June 3, 1947

2,421,625

UNITED STATES PATENT OFFICE 2,421,625

MANUFACTURE OF VULCANISED RUBBER ARTICLES

Herbert Emanuel Kretschmer, London, England, assignor, by mesne assignments, to British Insulated Callender's Cables Limited, London, England, a company of Great Britain Application February 11, 1944, Serial No. 521,919
In Great Britain February 15, 1943

5 Claims. (Cl. 18—53)

As a step in preparation for the vulcanising of rubber articles, for instance the rubber covering of electric wires and cables, it is common practice to cover the articles with a wrapping of textile tape or to enclose it in a lead sheath. The object of this procedure is to give support to the rubber when it softens on heating before or in the early part of vulcanisation, so that the shape and sound structure of the article is retained. By the present invention we provide an improved method of procedure in which a substitute for the coverings mentioned is used. In this procedure the unvulcanised rubber body is enclosed in a composite covering which consists of alternate layers of unvulcanised rubber compound and of vulcanised rubber compound. There may be a pair, or a number of pairs, of such layers. The inner layer of each pair is the unvulcanised layer. During vulcanisation of the article the unvulcanised part of the covering is also vulcanised and in this process it unites with the adjacent vulcanised layer or layers. When applying the layers by helical lapping on an article of appropriate shape, for instance the rubber covering of an electric cable, the layers can either be separate or intermingled, the latter arrangement being produced by lapping on simultaneously a vulcanised and an unvulcanised strip so placed that there is substantial overlap between them.

During the process of vulcanisation the vulcanised rubber part of the composite covering primarily gives support to the other rubber parts of the article while the initially unvulcanised layer of the covering directly adjacent to it ensures the completeness of the covering enclosing the article by binding the turns of the said outer layer together.

The method of procedure is particularly advantageous when the covering may be made a permanent part of the article. It may, however, also be used with advantage in cases where the covering is wholly or partially removed after the completion of vulcanisation. Where this is to be done precautions will be taken to prevent the covering, or the part of it which is to be removed, from adhering to the directly adjacent inner surface.

The improved procedure also has special advantages in cases where expansion is required to take place during vulcanisation. Such a condition occurs where the production of a cellular structure is to take place in the rubber, or a part of it, during the heat treatment. The covering produced in the manner indicated has the characteristic that it can extend under the influence of substantial internal pressure so that, for appropriate shapes, it provides the equivalent of a mould which is extensible.

In some cases it is desired to provide an electric cable, or other long cylindrical article with a low density cellular rubber part. This can be done in accordance with the present invention by forming a cylindrical body of rubber compound containing a blowing agent distributed in it, wrapping the body with the composite covering above described and subjecting the whole to an appropriate heat treatment. During this treatment the blowing agent gives off gas in the form of tiny bubbles distributed throughout the material to be expanded and this gas exerts very substantial pressure under which the covering yields to a sufficient extent to permit of the desired expansion taking place while maintaining an unbroken skin on the article. In this way a cylinder of low density cellular rubber with an adherent or non-adherent skin of non-cellular vulcanised rubber can be produced. Such a cylinder may form the core, or part of the core, around which wires are laid up helically to form the conductor of a cable which is then enclosed in an appropriate insulating covering. Alternatively, the conductor, or some other member may be enclosed within the core before the heat treatment takes place so that the expansion occurs around the outside of the wire or group of wires or other member leaving this embedded in the centre of a cylinder of cellular material having a close fitting non-cellular skin surrounding it.

Figure 2:
Figure 3:
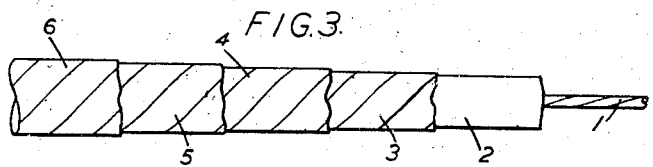
Figure 4:
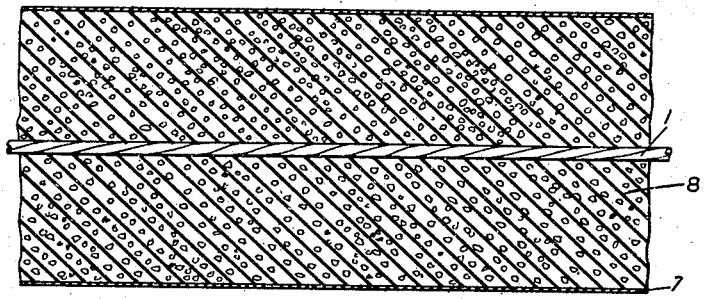
Figure 5:
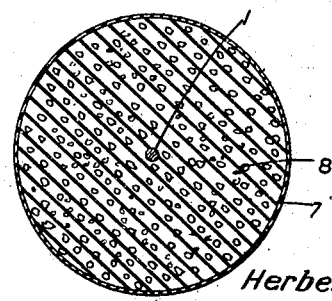

An example of the latter case is shown in the accompanying drawings, of which Figures 1, 2 and 3 relate to the conditions before vulcanising and Figures 4 and 5 relate to the conditions after vulcanising. Figure 1 is a longitudinal section and Figure 2 a transverse section, while Figure 3 is a view of the end of a length from which parts have been removed so as to expose other parts. Figures 4 and 5 are longitudinal and transverse sections respectively.

In this example, the conductor 1, which consists of a number of fine wires stranded together, is covered by a body of rubber compound 2, which contains, in addition to the vulcanising ingredients, a blowing agent, which on heating will liberate gas within the body of rubber. This may be, for instance, applied to the conductor by extrusion. Over it is wrapped helically a layer 3 formed of a strip of unvulcanised rubber compound, next is applied a layer 4 also of helically lapped strip, but in this case the compound has been vulcanised previously so as to be in a tough elastic state. The next layer 5 is of unvulcanised rubber strip, also helically lapped, and the final layer 6 is of previously vulcanised rubber strip. If it is intended that a layer, for instance the layer 6, should be stripped off after expansion and vulcanisation have taken place, then the outer surface of the layer 5 is covered with French chalk so as to prevent the layers 5 and 6 from adhering together.

After the layers 3, 4, 5 and 6 have been applied to form a composite covering, the whole is subjected to heat treatment, for instance by being placed within a vulcanising chamber and there subjected to steam at the appropriate temperature and for a sufficient length of time to cause the expansion of the rubber of the body 2 into a cellular form and the vulcanisation of this body and of the layers 3 and 5. In this treatment the layers 3, 4, 5 and 6 are stretched as indicated by a comparison made between Figures 1 and 2 and Figures 4 and 5. At the same time the layers 3, 4 and 5 are caused to adhere together and to the outside of the body 2, thus forming a continuous non-cellular skin 7 on the cellular body 8 (Figures 4 and 5). If the adhesion between the layers 5 and 6 has been prevented as suggested, then the layer 6 can readily be stripped from the vulcanised product.

In Figure 2 the layers 3 and 5 of unvulcanised rubber have been shown by the heavy black circles. In Figures 4 and 5 there is no attempt to distinguish between the separate layers; they have become amalgamated by the heat treatment.

In producing this type of article it will in many cases be advantageous to remove the outer part of the skin after vulcanisation has been completed. The extra strength of the outer part can then be utilised to resist the bursting force of the expanding gas during the heat treatment and that part can be removed subsequently so as to reduce the total weight of the article. The inner part of the skin left on the article serves as an additional enclosure to prevent leakage or diffusion of gas out of the cellular body.

It is to be noted that the application of the invention is not limited to bodies of cylindrical form. At the same time it will be seen that in cases where expansion of the enclosed body, accompanied by stretching of the composite covering, to a shape determined by the covering is to take place, these conditions impose limitations on the shape of the article which can be produced. In such cases the symmetry of form which the expansion will tend to produce makes the method particularly applicable to the production of articles which are to be cylindrical, spherical or toroidal.

It is to be understood that the term "rubber" used herein is meant to include not only natural rubber, but synthetic rubbery materials having properties which make the described procedure applicable to them, either as the enclosed body or as an enclosing layer.

What I claim as my invention is:

1. A method of vulcanising rubber, comprising enclosing a body of unvulcanised rubber compound in a composite covering consisting of superimposed layers which are alternately unvulcanised rubber compound and vulcanised rubber compound, the innermost layer being unvulcanised, and subjecting the whole to a heat treatment which vulcanises the body and unvulcanised portion of the covering, the covering supporting the enclosed body during vulcanisation.

2. A method of vulcanising rubber, comprising enclosing a body of unvulcanised rubber compound in a covering consisting of an outer covering portion comprising vulcanised rubber compound, an inner covering portion and an adhesion preventing material between the inner and outer covering portions, the inner covering portion consisting of superimposed layers which are alternately unvulcanised rubber compound and vulcanised rubber compound, the innermost layer of the inner covering portion being unvulcanised, subjecting the whole to a heat treatment which vulcanises the body and unvulcanised parts of the covering and then stripping the outer covering portion from the inner covering portion.

3. A method of expanding and vulcanising rubber, comprising enclosing a body of unvulcanized expandable rubber compound in a composite supporting covering consisting of superimposed layers which are alternately unvulcanised rubber compound and vulcanised rubber compound, the innermost layer being unvulcanised, and subjecting the whole to heat treatment, causing thereby the expansion of the enclosed body and the stretching of the covering and the vulcanisation of the body and unvulcanised portion of the covering.

4. A method of vulcanising a cylindrical body consisting at least mainly of unvulcanized rubber, comprising wrapping such a body with helically applied strips which are alternately of vulcanised and unvulcanised rubber compounds, the innermost layer being unvulcanised, and subjecting the whole without external support to heat treatment which vulcanises the body and unvulcanised portion of the covering.

5. In the vulcanisation and expansion by heat treatment of a body of expandable unvulcanized rubber compound, the steps of enclosing the body prior to heat treatment in a covering which is stretchable under internal pressure and consists of alternate layers of vulcanised rubber compound and unvulcanised rubber compound arranged so that the covering will adhere to the body when vulcanized and applying the heat treatment to the body thus enclosed whereby to expand and vulcanise the body and form a skin thereon.

HERBERT EMANUEL KRETSCHMER.

REFERENCES CITED

The following references are of record in the file of this patent:

UNITED STATES PATENTS

| Number | Name | Date |
| --- | --- | --- |
| 1,659,371 | Merrill | Feb. 14, 1928 |
| 1,978,041 | Dodge | Oct. 23, 1934 |
| 2,186,793 | Wodtke | Jan. 9, 1940 |